Nov. 9, 1954 E. M. ROSCHKE 2,694,105

SUBSCRIBER TELEVISION TRANSMITTER

Filed Jan. 30, 1952 3 Sheets-Sheet 1

INVENTOR:
ERWIN M. ROSCHKE
BY Francis W. Crotty
HIS ATTORNEY.

Nov. 9, 1954 E. M. ROSCHKE 2,694,105

SUBSCRIBER TELEVISION TRANSMITTER

Filed Jan. 30, 1952 3 Sheets-Sheet 2

INVENTOR:

ERWIN M. ROSCHKE

BY Francis W. Crotty

HIS ATTORNEY.

Nov. 9, 1954 E. M. ROSCHKE 2,694,105

SUBSCRIBER TELEVISION TRANSMITTER

Filed Jan. 30, 1952 3 Sheets-Sheet 3

INVENTOR.
ERWIN M. ROSCHKE
BY Francis W. Crotty
HIS ATTORNEY.

2,694,105

SUBSCRIBER TELEVISION TRANSMITTER

Erwin M. Roschke, Des Plaines, Ill., assignor to Zenith Radio Corporation, a corporation of Illinois Application January 30, 1952, Serial No. 268,967

5 Claims. (Cl. 178—5.1)

Figure 1:
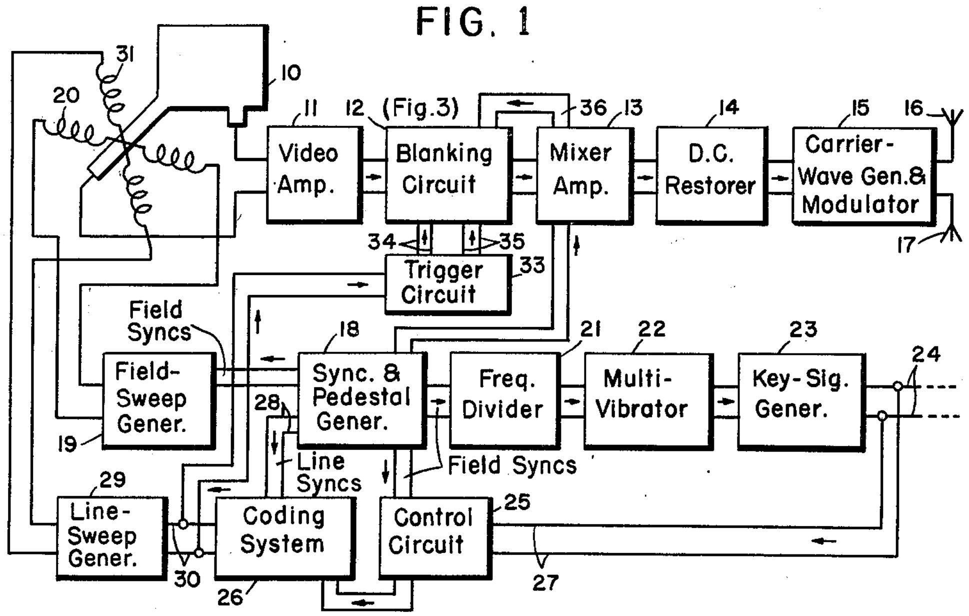

This invention relates to subscription television systems of the type in which a television signal is coded by varying the relative timing of its video and synchronizing components in accordance with a coding schedule. More specifically, the invention is directed to a subscription television transmitter utilizing a video-signal blanking stage for suppressing the video components of the coded television signal during selected intervals and establishing the television signal at a predetermined signal level during such intervals to prevent distortion that might otherwise arise, and provides an improved arrangement whereby unauthorized utilization of this signal level for decoding purposes is rendered extremely difficult if not virtually impossible.

Patent 2,547,598, issued April 3, 1951, in the name of the instant inventor, entitled "Subscription, Image Transmission System and Apparatus," and assigned to the present assignee, discloses and claims a subscription television system wherein the transmitted television signal is coded by altering the relative timing of the video and synchronizing components during spaced intervals determined by a selected coding schedule. A key signal indicating the times of occurrence of these spaced intervals is generated at the transmitter and distributed to subscriber receivers by any suitable means, for example, by means of existing telephone lines. The key signal is utilized at the various receivers to actuate decoding apparatus and enable the receivers to decode and reproduce the coded subscription telecast. It has been found that when the coded television signal of this system is corrected at a subscriber receiver a flicker sometimes appears in the reproduced image. This flicker is attributable to an inequality of picture content in successive video fields of the television signal as the timing of the video components relative to the synchronizing components is altered in accordance with the coding schedule. Such inequality of picture content produces a low-frequency signal that usually is not translated faithfully by the various stages of the transmitter, thus producing distortion in the coded telecast which is manifested as flicker in the reproduced image.

A system for eliminating the above-described condition is disclosed in copending application Serial No. 31,345, filed June 5, 1948, and issued March 23, 1954, as Patent 2,673,237, in the name of Pierce E. Reeves, entitled "Subscriber Transmission System" and assigned to the present assignee. The Reeves' system includes a video-signal blanking stage which replaces a predetermined portion of each line trace of the video signal with a pulse of reference potential level, the position of this portion within the line-trace interval being so controlled that the picture content of successive video fields of the television signal is equalized regardless of the alterations in timing of the video and synchronizing components.

In accordance with the Reeves' application, the potential level of the aforementioned pulses is adjusted to a value corresponding preferably to some gray shade in the video signal. This was considered desirable since the timing of blanking stage is changed in accordance with the coding schedule and, should they have an amplitude in excess of the average amplitude of the video signal, it would be possible for unauthorized receivers to utilize these pulses for decoding purposes. It has been found that under some conditions, even when the potential level of these pulses corresponds to some intermediate value of the video signal, it may still be possible for unauthorized receivers to derive the required coding information therefrom. In order to overcome that possibility, copending application Serial No. 187,072, filed September 27, 1950, in the name of the instant inventor, entitled "Subscription Television Transmitter" and assigned to the present assignee, discloses a system in which a random-noise signal is superposed on the pulses to provide composite signal components. However, due to the fact that the average value of the video components changes with variations in background illumination while their maximum values are subject to continuous changes, it may be still possible under certain circumstances to compare the relatively constant amplitude composite components of the Roschke system with the video components to derive the coding information. The present invention provides an arrangement in which the amplitude of the aforementioned composite components is controlled in accordance with the video information to render such comparison impossible for all practical purposes.

It is, accordingly, an object of the invention to provide an improved subscription television transmitter for transmitting a coded television signal which includes additional signal components for eliminating distortion that might otherwise arise, and having such composition that their utilization for unauthorized decoding of the television signal is prevented for all practical purposes.

A further object of the invention is to provide an improved subscription television transmitter for transmitting a coded television signal which includes additional signal components for eliminating distortion that might otherwise arise, and in which the signal components have a varying amplitude so related to the amplitude of the video components of the coded television signal that separation of these components for unauthorized decoding purposes is rendered virtually impossible.

The subscription television transmitter of the invention comprises a video-signal source for developing a video signal during recurrent line-trace intervals, and a synchronizing-signal source for developing during interposed retrace intervals a synchronizing signal normally having a certain time relation with respect to the trace intervals. A coding circuit is provided for altering the timing of the aforesaid trace intervals with respect to the synchronizing signal in accordance with a coding schedule. Suitable networks are coupled to the video and synchronizing sources for producing a television signal having video and synchronizing components. A blanking circuit is coupled to the video source for suppressing the video components, and means is provided for actuating the blanking circuit during a selected portion of each of the line-trace intervals to equalize the video content represented by the video signal during the line-trace intervals irrespective of the time relation of the video and synchronizing signals. The transmitter also includes a network for establishing a selected signal level in the television signal during the aforesaid selected portions of the line-trace intervals, and a control circuit is coupled to this network and responds to an applied control signal for adjusting the amplitude value of the signal level. A further means is then provided for applying a control signal to the control circuit to vary the amplitude of the signal level in accordance with a prescribed schedule.

Figure 2:
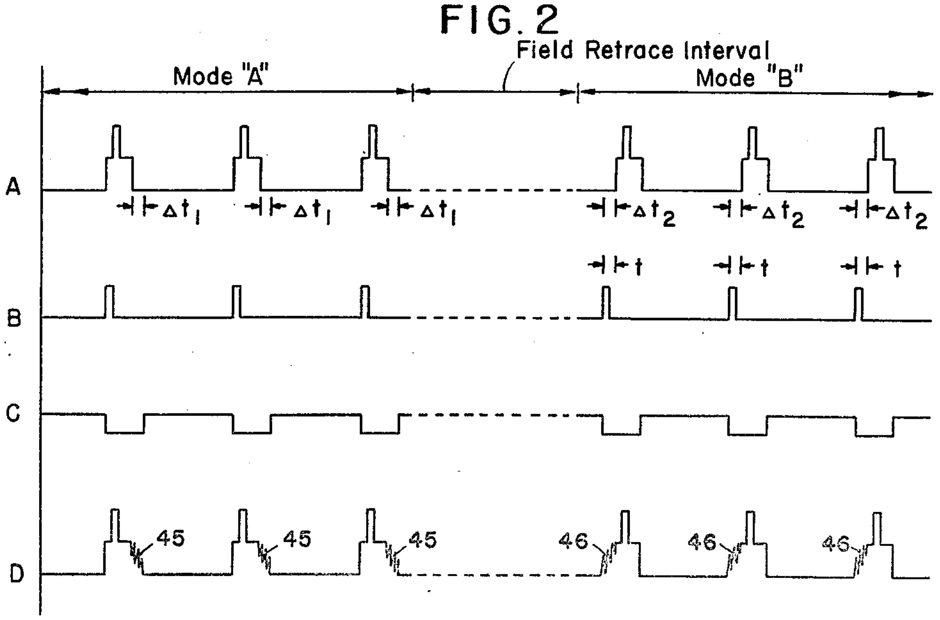
Figure 3:
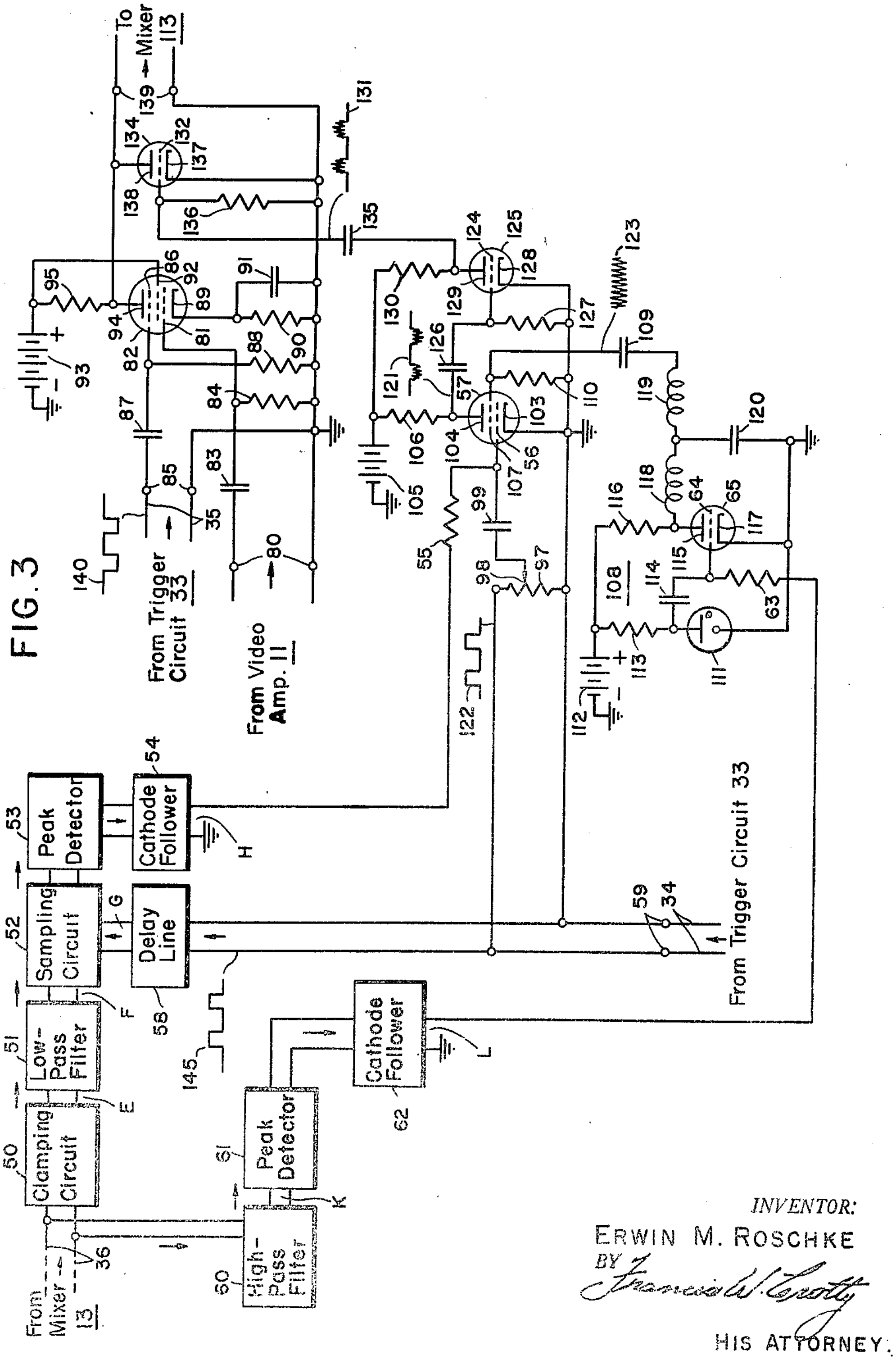
Figure 4:
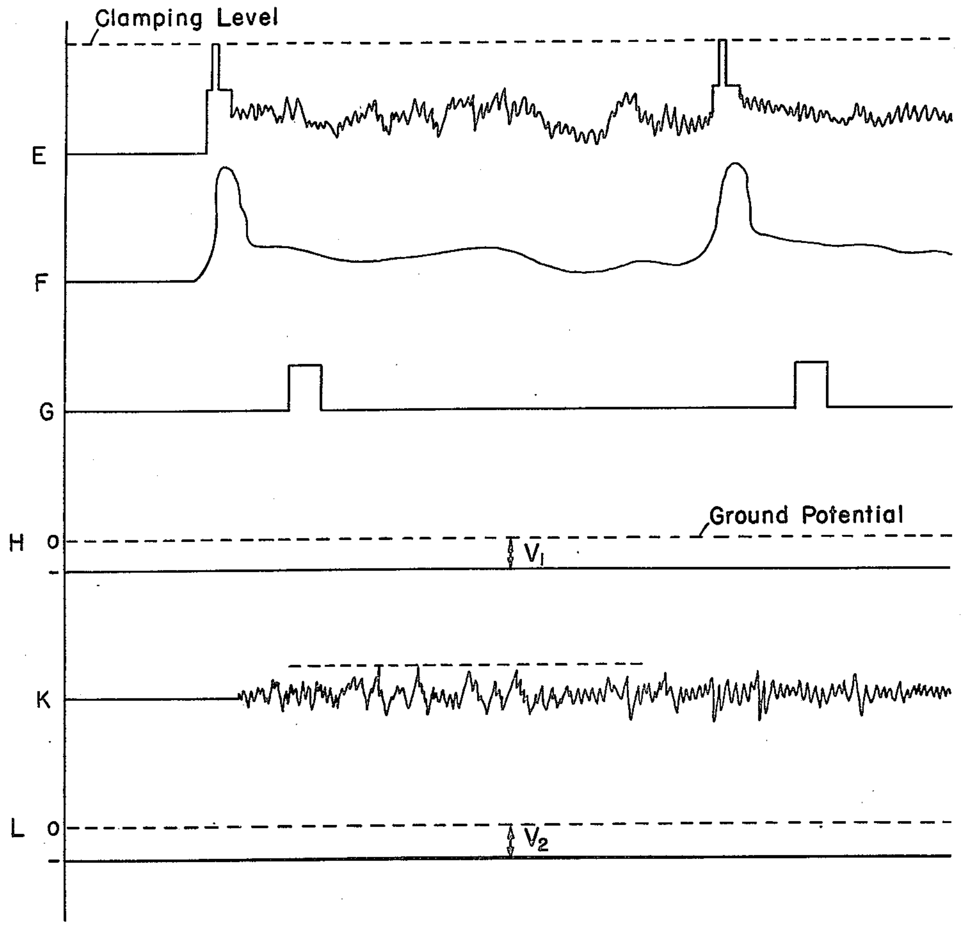

The features of this invention which are believed to be new are set forth with particularity in the appended claims. The invention itself, however, together with further objects and advantages thereof may best be understood by reference to the following description when taken in conjunction with the accompanying drawings, in which:

Figure 1 represents a subscription television transmitter incorporating the invention;

Figure 2 comprises various curves employed in explaining the operation of the transmitter of Figure 1;

Figure 3 is a detailed representation of one of the components of the transmitter of Figure 1; and Figure 4 comprises curves indicating the operation of the arrangement of Figure 3.

The transmitter of Figure 1 includes a video-frequency generating device or camera tube 10 of any well-known type connected to a video amplifier 11 of any desired number of stages. The video amplifier has output terminals connected to a video-blanking circuit 12 constructed in a manner to be described in detail in conjunction with Figure 3. The output terminals of unit 12 are connected to a mixer amplifier 13 which, in turn, is connected to a background or D. C. restorer 14. The latter circuit is connected to a carrier-wave generator and modulator 15 which may be coupled to a suitable antenna circuit 16, 17. The transmitting system further includes a synchronizing signal and blanking pedestal generator 18 which is connected to mixer amplifier 13 to supply line- and field-synchronizing and pedestal pulses thereto. Unit 18 is also connected to a field-sweep generator 19 and supplies field-synchronizing pulses thereto, sweep generator 19 being coupled to field-deflection elements 20 of device 10. Unit 18 is further connected to a frequency divider 21 and supplies field-synchronizing pulses to this divider which preferably is of the random type disclosed in copending application Serial No. 32,457, filed June 11, 1948, issued March 11, 1952, as Patent 2,588,413 in the name of the instant inventor, entitled "Random Frequency Divider" and assigned to the present assignee. The output terminals of frequency divider 21 are connected to a multivibrator 22 which, in turn, is connected to a key-signal generator 23 having output terminals coupled to a line circuit 24 extending to the various subscriber receivers. Multivibrator 22 is preferably of the "Eccles-Jordan" type, that is, it has two stable operating conditions and is triggered between these conditions by successive pulses of like polarity from frequency divider 21. The multivibrator controls the key-signal generator so that a burst of key signal appears on line circuit 24 whenever the multivibrator is in a selected one of its two operating conditions.

Unit 18 is also connected to a control circuit 25 and supplies field-synchronizing pulses thereto, the control circuit being connected to a coding system 26 and to the output terminals of key-signal generator 23 by leads 27. Unit 18 supplies line-synchronizing pulses to coding system 26 by way of leads 28 and the output terminals of the coding system are connected to a line-sweep generator 29 by leads 30, the output terminals of sweep generator 29 being coupled to the line-deflection elements 31 of device 10. The leads 30 are further connected to the input terminals of a trigger circuit 33, having output terminals connected to video-signal blanking stage 12 by way of leads 34 and 35. Trigger circuit 33, in a manner to be described, impresses an actuating signal on blanking circuit 12, the actuating signal being impressed thereon with one polarity over leads 34 and with opposite polarity over leads 35. The blanking circuit is also connected to mixer amplifier 13 by leads 36 to derive the composite television signal from the mixer circuit.

Device 10 generates video-frequency components representing a subject scanned thereby, and these components are amplified in video amplifier 11, translated through blanking stage 12 and mixed with synchronizing and pedestal pulses from unit 18 in mixer amplifier 13. The resulting composite television signal is adjusted as to background level in circuit 14 and is modulated on a suitable carrier wave in unit 15 for radiation from antenna 16, 17. Field-synchronizing pulses from unit 18 are applied to field-sweep generator 19 to control the field scansion of device 10, and line-synchronizing pulses from unit 18 are supplied to line-sweep generator 29 through coding system 26 to control the line scansion of this device.

Field-synchronizing pulses from unit 18 are also impressed on frequency divider 21 which effects a random frequency division of these pulses, the resulting frequency-divided pulses being used to trigger multivibrator 22. The multivibrator controls key-signal generator 23 so that a burst of key signal appears on line circuit 24 during spaced operating intervals which occur preferably at random times. It is to be noted that each key-signal burst is initiated and terminated in response to frequency-divided field-synchronizing pulses and, therefore, during field-retrace intervals of the system.

The bursts of key signal from generator 23 are also impressed on control circuit 25 over leads 27. The control circuit is constructed so that it is actuated from one operating condition to another by the field-synchronizing pulse succeeding the initiation of each key-signal burst and is returned to the first operating condition by the field-synchronizing pulse succeeding the termination of each such burst. This actuation of the control circuit develops control pulses which are impressed on coding system 26, causing that system to advance the timing of the line-synchronizing pulses translated therethrough by a selected amount in response to and throughout the duration of each control pulse. Accordingly, the timing of the line scansion of device 10 is altered a corresponding amount during spaced intervals represented by the control pulses and this effects an alteration in the timing of the video signal generated by this device relative to the line-synchronizing pulses generated by unit 18. In this manner the television signal radiated by antenna 16, 17 is coded and standard television receivers are unable to reproduce the intelligence represented thereby since such receivers require an invariable time relation of video to synchronizing information to synthesize an image.

The control pulses supplied to coding system 26 from control circuit 25 are initiated and terminated by field-synchronizing pulses and, therefore, during field-retrace intervals, so that the timing changes of the line-synchronizing pulses impressed on line-sweep generator 29 also occur during field-retrace intervals. This precludes distortion in the image reproduced in subscriber receivers that might occur should such timing changes take place during field-trace intervals. Moreover, since each key-signal burst is initiated and terminated by field-synchronizing pulses preceding the field-synchronizing pulses initiating and terminating the control pulses from control circuit 25, slight delays of the key signal that might be introduced in the line circuit may be tolerated with no adverse effect on the proper operation of the system.

The components of the transmitter thus far referred to, with the exception of units 12, 25 and 26, are well known to the art and a further description thereof is deemed to be unnecessary. The construction of unit 12 is to be described in detail, and the details of control circuit 25 and coding system 26 are fully disclosed in the aforementioned Patent 2,547,598. Since the present invention is not concerned with circuits 25 and 26, it is believed unnecessary to include a detailed description thereof.

Reference is now made to the curves of Figure 2 for a more complete explanation of the distortion that may arise due to inequality of picture content in successive fields of the radiated television signal, how such distortion may be eliminated by the introduction of blanking components into the coded television signal, and how the improved arrangement of this invention determines the composition of such blanking components to maintain secrecy of the television signal. Curve A represents certain line-synchronizing pulses superposed on suitable pedestals and supplied to mixer amplifier 13 from generator 18. The "jittered" line-synchronizing pulses, that is to say pulses with a changing time relation, derived from coding system 26 are shown in curve B. During one mode of operation of the transmitter, designated mode "A," horizontal drive pulses are derived from coding system 26 with no change in timing and occur as in the usual operation of television transmitters with their leading edges in time coincidence with the leading edges of corresponding pedestal pulses of curve A. However, during the second mode of operation, designated mode "B," the drive pulses derived from coding system 26 are advanced a time interval $t$ relative to the drive pulses derived during mode "A." As previously described, the mode "B" operation of the system is established during spaced intervals when control circuit 25 applies a control pulse to coding system 26.

During mode "B" operation, since the line-synchronizing pulses applied to line-sweep system 29 are advanced an interval $t$ by coding system 26, the line scansion of device 10 is advanced a corresponding amount. This advanced the timing of the video signal generated by device 10 relative to the line-synchronizing and pedestal components applied to mixer 13. Such timing changes in the video signal relative to the synchronizing components of the radiated composite television signal provide effective coding of the television broadcast. However, it may be shown that there is a resulting picture or video unbalance in the composite signal derived from mixer 13.

Specifically, at the start of each line trace during mode "A" operation there is a portion of the video components that falls within the short interval $\Delta t_1$ which does not appear during mode "B" operation since the advance of the video components relative to the blanking pedestals in the latter mode causes this portion to fall within the interval of the immediately preceding pedestal. Additionally, there is a portion of the video components that falls within the interval $\Delta t_2$ at the end of each line trace during mode "B" operation which does not appear in mode "A" operation since in the latter, this portion, likewise, falls within the immediately adjacent but succeeding pedestal. As a consequence, there is an unbalance of picture content as the timing of the video components changes relative to the synchronizing and pedestal components of the radiated signal in accordance with the coding schedule which determines the shift in modes of operation. Under some conditions this unbalance may cause distortion in the image reproduced by subscriber receivers due to the limitations of various stages of the transmitter. The purpose of units 12 and 33 is to suppress those portions of the video signal during each of the line-trace intervals which appear in one mode but not in the other. As disclosed in the aforementioned Reeves application, the blanked out portions may be superseded by additional signal components having a selected amplitude corresponding to a "gray" value of the video information and having a timing that is varied with the variations in timing of the video components relative to the line-synchronizing components developed by generator 18. In accordance with the instant invention, the amplitude of such additional signal components is adjusted in accordance with amplitude variations of the video components so as to preclude unauthorized comparison of these components to obtain the coding schedule of the television signal.

The jittered line-synchronizing pulses from coding system 26 are applied as actuating pulses to trigger circuit 33 to produce the pulses shown in curve C. Trigger circuit 33 may comprise a single-shot multivibrator constructed in a manner well known to the art and, preferably, containing a width control for adjusting the width of the output pulse obtained each time the multivibrator is triggered. These output pulses are applied to video blanking circuit 12 which is so adjusted that the signal derived from mixer amplifier 13, as shown in curve D, includes additional signal components 45 during mode "A" operation and signal components 46 during mode "B" operation.

Each component 45 overlaps a line-synchronizing pedestal pulse extending beyond the trailing edge of the corresponding pedestal pulse by an amount determined by the trailing edge of each of the pulses of curve C. preferably, the width adjustment of trigger circuit 33 is so set that the projecting portion of each component 45 fills the intervals $\Delta t_1$ to suppress any video signal that might otherwise appear in such intervals. Similarly, each component 46 of mode "B" intervals overlaps and projects beyond the leading edge of an associated line-pedestal pulse to suppress video information that might otherwise appear in the intervals $\Delta t_2$. Consequently, the effect of components 45, 46 is that no video signal appears in one operating mode that does not occur in the other, and the distortion that sometimes occurs in subscription television signals because of the inequality of picture content is eliminated.

Signal components 45 and 46 may be made up of pulses with a selected noise signal pedestalled thereon to prevent unauthorized utilization of the components for decoding purposes. Such a feature is described and claimed in copending application Serial No. 187,072, filed September 27, 1950, in the name of E. M. Roschke, and assigned to the present assignee. The instant invention provides that the amplitude level of either the pulses or the noise signal, or both, be controlled in accordance, for example, with amplitude variations of the video components further to preclude such unauthorized utilization. The desired control of components 45, 46 may be accomplished by the blanking circuit of the invention shown in detail in Figure 3.

The arrangement of Figure 3 includes a clamping circuit 50, having input terminals connected to an output circuit of mixer amplifier 13 by leads 36 and having output terminals connected through a low-pass filter 51 to a sampling circuit 52 which, in turn, is connected to a peak detector 53. The output terminals of the peak detector are coupled to a cathode follower 54 which, in turn, is connected through a resistor 55 to the control electrode 56 of an electron-discharge device 57. The blanking circuit has one pair of input terminals 59 connected to trigger circuit 33 over leads 34, these input terminals being connected to sampling circuit 52 through a delay line 58. A high-pass filter 60 is also connected to the leads 36 from mixer 13 and the output terminals of this filter are connected to another peak detector 61. This detector is coupled to a cathode follower 62 which, in turn, is connected through a grid-leak resistor 63 to the control electrode 64 of an electron-discharge device 65.

The blanking circuit includes a further pair of input terminals 80 connected to the output circuit of video amplifier 11. One of the terminals 80 is grounded and the other is connected to a control electrode 81 of an electron-discharge device 82 through a coupling capacitor 83, the control electrode being connected to ground through a grid-leak resistor 84. The blanking circuit includes still another pair of input terminals 85 connected to trigger circuit 33 by leads 35. One of the terminals 85 is grounded and the other is coupled to a second control electrode 86 of device 82 through a coupling capacitor 87, electrode 86 being connected to ground through a grid-leak resistor 88. The cathode 89 of device 82 is connected to ground through a resistor 90 shunted by a by-pass capacitor 91 and the screen grid 92 is connected to the positive terminal of a source of unidirectional potential 93, while the anode 94 is connected to this terminal through a load resistor 95.

The input terminals 59 are also connected to a potentiometer 97 having one side grounded. An adjustable tap 98 of the potentiometer is coupled to the control electrode 56 of discharge device 57 through a coupling capacitor 99. Cathode 103 of device 57 is directly connected to ground and the anode 104 is connected to the positive terminal of a unidirectional potential source 105 through a load resistor 106. A further control electrode 107 of device 57 is connected to a random signal generator 108 through a capacitor 109 and is connected to ground through a grid-leak resistor 110.

The random-signal generator 108 comprises a gaseous discharge device 111 having its anode connected to the positive terminal of a unidirectional potential source 112 through a load resistor 113, and its cathode connected to ground. The anode of device 111 is coupled through a capacitor 114 to the control electrode 64 of device 65 which is employed as an amplifier for the signal developed by gas tube 111. Anode 115 of amplifier 65 is connected to the positive terminal of source 112 through a load resistor 116 and the cathode 117 is connected to ground. Anode 115 is also connected to capacitor 109 through a low-pass filter network which includes inductance coils 118 and 119 and a capacitor 120 coupling the junction of these coils to ground.

Since gas tube 111 is connected between the positive terminal of unidirectional potential source 112 and ground, a space current having random amplitude and frequency characteristics flows therethrough, producing a random noise signal across resistor 113 for amplification in device 65. The filter 118, 119 and 120 passes noise signal frequencies approximating the frequencies of the video components, for reasons to become apparent, and a noise signal such as shown by the waveform 123 is supplied thereby to control electrode 107 of device 57. Trigger circuit 33 concurrently delivers a signal 122 having positive-polarity pulse components to control electrode 56 of device 57 by way of terminals 59, potentiometer 97 and coupling capacitor 99. This pulse-modulated signal gates device 57, that is, the device is rendered conductive to the noise signal only in the presence and for the duration of the positive pulse components of the gating signal 122 so that its output signal 121 comprises bursts of noise signal impressed on negative-polarity pulse components.

The anode 104 of device 57 is coupled to a control electrode 124 of an electron-discharge device 125 through a coupling capacitor 126, the control electrode being connected to ground through a grid-leak resistor 127. Cathode 128 of device 125 is connected to ground and the anode 129 is connected to the positive terminal of potential source 105 through a load resistor 130. Device 125 is employed merely as a phase inverter to produce a signal of waveform 131 in its output circuit in response to signal 121 applied to its control electrode.

Anode 129 of phase inverter 125 is coupled to a control electrode 132 of an electron-discharge device 134 through a coupling capacitor 135, the control electrode being connected to ground through a grid-leak resistor 136. Cathode 137 of device 134 is connected directly to ground, and its anode 138 is directly connected to anode 94 of device 82. Anodes 94 and 138 are connected to one of the output terminals 139 of the blanking circuit, the other output terminal being connected to ground. These output terminals are connected to the input terminals of mixer amplifier 13.

In considering the operation of the blanking circuit, it is to be remembered that the pulse-modulated signal 140 and the video signal are concurrently applied to control electrodes 86 and 81 respectively of tube 82. During the intervals intervening the negative-polarity pulse components of signal 140, device 82 is conductive and the video signal from video amplifier 11 is translated to the output terminals 139 for application to mixer amplifier 13. For the duration of each negative pulse of signal 140, however, device 82 is rendered non-conductive, establishing a signal level represented by its anode potential at a fixed shade value corresponding to the maximum or "black" value of the video signal. Accordingly, the signal potential at output terminals 139 due solely to the presence of the negative polarity pulses at terminals 85 has a certain preselected level irrespective of the video signal received at terminals 80. In this manner, a pulse is introduced into the video signal available at terminals 139; one such pulse occurs during the interval of each negative polarity component of the control signal applied to terminals 85.

It is desirable to control the amplitude of the above mentioned pulses introduced into the video signal in order to prevent unauthorized synchronization thereon. This is accomplished by discharge device or tube 134 which may be considered to comprise a control network which receives a composite control signal of positive polarity and controlled amplitude during the blanking interval. More particularly, the composite control signal comprises a series of bursts of random noise signal individually superposed on a pulse of positive polarity as indicated by waveform 131. The control signal appears in inverted phase in the common output circuit of devices 82 and 134 and is superimposed on the aforementioned pulses otherwise developed by device 82.

Accordingly, the effect of tube 34 under the control of signal 131 is to convert the pulses introduced into the video signal at terminals 139 from a reference shade value corresponding to black (as established by tube 82 alone) to composite components represented by random noise superposed on a pulse pedestal. The amplitude levels of either or both the random noise and the pedestals are adjustable in accordance with the video signal, as described hereinafter, to relate the amplitude of the resulting pulses to video rather than have them represent any fixed shade value.

Signal 140 which determines the blanking intervals of tube 82 is derived directly from trigger circuit 33, and signal 131 which controls tube 134 is likewise derived from the same trigger circuit, being composed in part of signal 122 obtained directly from the trigger circuit. Hence, signals 140 and 131 have the same time-phase relation which is required to achieve the desired composite components described above. Moreover, since trigger circuit 33 is actuated by the output signal of coding system 26, the timing of both signals 140 and 131 is varied in accordance with the coding schedule. Therefore, the timing of the composite components follows the coding schedule, being shifted as explained in the discussion of Figure 2 to equalize the picture content of successive video fields regardless of changes in the operating mode of the transmitter.

In one embodiment of the instant invention, the amplitude level of the bursts of random noise contained in signal 131 is controlled in accordance with variations in the maximum amplitude of the video signal. At the same time the amplitude of the pedestal pulses for the random noise is controlled in accordance with the average value of the video signal which varies with background illumination. The overall control on the amplitude of signal 131 is made such that the additional signal components introduced into the video components appearing across output terminals 139 have an amplitude which is similar to all intents and purposes to the video components to preclude unauthorized comparison of the two to derive a coding schedule.

In achieving an amplitude control of the blanking pulses from the video information, the composite television signal produced at the output terminals of mixer 13 is applied over leads 36 to clamping circuit 50 wherein the peaks of the synchronizing components are established in well-known manner at some reference level so that the average value of the television signal varies in accordance with the background illumination. The stabilized signal obtained from the clamping circuit is shown in curve E of Figure 4 and is passed through low-pass filter 51 which removes the high-frequency components and supplies the signal shown in curve F to sampling circuit 52. The sampling circuit is a gated repeater which responds to gating pulses derived from an adjustable delay line 58 to supply a selected portion only of the low-frequency components to peak detector 53. Delay line 58 obtains a signal 145 from trigger circuit 33, having positive pulse components and corresponding to signal 122. The output signal of the delay line is shown in the curve G and comprises one gating pulse occurring during each line-trace interval so that the sampling circuit applies a selected portion of the low-frequency components of the video signal exclusive of the synchronizing components to the peak detector regardless of the mode of operation of the transmitter. The selected low-frequency components have an amplitude value that varies substantially in accordance with variations in the average value of the video components. The peak detector develops a unidirectional control potential having amplitude variations corresponding to the variations in the average level of the selected video portion. This control potential is supplied to cathode follower 54 which, in turn, produces a similar control potential but displaced on a negative axis with respect to ground. This action of the cathode follower may be effected by connecting the anode of the device comprising the unit to ground and the cathode thereof to a point negative with respect to ground. The latter control potential is shown in curve H and indicated $V_1$. The control potential from the cathode follower is applied to control electrode 56 to control the gain of device 57 and, therefore, the amplitude of the pedestal pulse components of signal 121 and signal 131. As previously stated, amplitude variations in the selected low-frequency video components correspond substantially to the variations in the average value of the video signal, and the pulse components of signal 131 therefore have an amplitude which also varies substantially in accordance with such average-value variations. Of course, the amplitude variations of the pulses are with respect to a reference value determined by the setting of tap 98 of potentiometer 97.

The television signal from mixer 13 is also applied to high-pass filter 60 which develops the signal shown in curve K, corresponding to the high-frequency video components of the television signal. The signal from the high-pass filter is impressed on peak detector 61 which produces a control potential having amplitude variations corresponding to variations in the peak amplitude of this signal. Cathode follower 62, like unit 54, establishes the control potential on a negative axis with respect to ground and applies the control potential $V_2$ shown in curve L to the control electrode 64 of device 65. Consequently, the gain of device 65 and the amplitude of noise signal 123 are adjusted in accordance with variations in the maximum amplitude of the high-frequency video components.

The invention provides, therefore, an improved subscription television transmitter for transmitting a coded television signal including additional components having characteristics similar to the video components of the television signal to preclude a comparison between these components for unauthorized decoding purposes.

While a particular embodiment of the invention has been shown and described, modifications may be made and it is intended in the appended claims to cover all such modifications as may fall within the true spirit and scope of the invention.

I claim:

1. A subscription television transmitter comprising: a source for developing video-frequency components during recurring line-trace intervals; a source for developing synchronizing components during interposed retrace intervals indicating a timing function of said video source and normally having a certain time relation with respect to said trace intervals; a coding circuit for altering the timing of said trace intervals with respect to said synchronizing components in accordance with a coding schedule; means coupled to said video and synchronizing sources for producing a television signal including said video-frequency components and said synchronizing components; a blanking circuit for suppressing said video-frequency components; means, comprising means for actuating said blanking circuit during a selected portion of each of said line-trace intervals, for equalizing the video content represented by said video-frequency components during said line-trace intervals irrespective of the time relation of said line-trace intervals and said synchronizing signal; means for establishing a signal level in said television signal during said selected portions of said line-trace intervals; a control circuit responsive to an applied control signal for adjusting the amplitude value of said signal level; and means for applying a unidirectional control signal to said control circuit to vary the amplitude of said signal level in accordance with a prescribed schedule.

2. A subscription television transmitter comprising: a source for developing video-frequency components during recurring line-trace intervals; a source for developing synchronizing components during interposed retrace intervals indicating a timing function of said video source and normally having a certain time relation with respect to said trace intervals; a coding circuit for altering the timing of said trace intervals with respect to said synchronizing components in accordance with a coding schedule; means coupled to said video and synchronizing sources for producing a television signal including said video-frequency components and said synchronizing components; a blanking circuit for suppressing said video-frequency components; means, comprising means for actuating said blanking circuit during a selected portion of each of said line-trace intervals, for equalizing the video content represented by said video-frequency components during said line-trace intervals irrespective of the time relation of said line-trace intervals and said synchronizing signal; means for establishing a signal level in said television signal during said selected portions of said line-trace intervals; a control circuit responsive to an applied control signal for adjusting the amplitude value of said signal level; and means for applying a unidirectional control signal, representing variations of a selected characteristic of a reference signal, to said control circuit to effect corresponding variations in the amplitude of said signal level.

3. A subscription television transmitter comprising: a source for developing video-frequency components during recurring line-trace intervals; a source for developing synchronizing components during interposed retrace intervals indicating a timing function of said video source and normally having a certain time relation with respect to said trace intervals; a coding circuit for altering the timing of said trace intervals with respect to said synchronizing components in accordance with a coding schedule; means coupled to said video and synchronizing sources for producing a television signal including said video-frequency components and said synchronizing components; a blanking circuit for suppressing said video-frequency components; means, comprising means for actuating said blanking circuit during a selected portion of each of said line-trace intervals, for equalizing the video content represented by said video-frequency components during said line-trace intervals irrespective of the time relation of said line-trace intervals and said synchronizing signal; means for establishing a signal level in said television signal during said selected portions of said line-trace intervals; a control circuit responsive to an applied control signal for adjusting the amplitude value of said signal level; and means for applying a unidirectional control signal, representing variations in the average level of said video-frequency components, to said control circuit to effect corresponding variations in the amplitude of said signal level.

4. A subscription television transmitter comprising: a source for developing video-frequency components during recurring line-trace intervals; a source for developing synchronizing components during interposed retrace intervals indicating a timing function of said video source and normally having a certain time relation with respect to said trace intervals; a coding circuit for altering the timing of said trace intervals with respect to said synchronizing components in accordance with a coding schedule; means coupled to said video and synchronizing sources for producing a television signal including said video-frequency components and said synchronizing components; a blanking circuit for suppressing said video-frequency components; means, comprising means for actuating said blanking circuit during a selected portion of each of said line-trace intervals, for equalizing the video content represented by said video-frequency components during said line-trace intervals irrespective of the time relation of said line-trace intervals and said synchronizing signal; means for establishing a signal level in said television signal during said selected portions of said line-trace intervals; a control circuit responsive to an applied control signal for adjusting the amplitude value of said signal level; means for applying a unidirectional control signal, representing variations in the average level of said video-frequency components, to said control circuit to effect corresponding variations in the amplitude of said signal level; a random-signal generator for producing a noise signal; and a circuit for impressing said noise signal on said signal level.

5. A subscription television transmitter comprising: a source for developing video-frequency components during recurring line-trace intervals; a source for developing synchronizing components during interposed retrace intervals indicating a timing function of said video source and normally having a certain time relation with respect to said trace intervals; a coding circuit for altering the timing of said trace intervals with respect to said synchronizing components in accordance with a coding schedule; means coupled to said video and synchronizing sources for producing a television signal including said video-frequency components and said synchronizing components; a blanking circuit for suppressing said video-frequency components; means, comprising means for actuating said blanking circuit during a selected portion of each of said line-trace intervals, for equalizing the video content represented by said video-frequency components during said line-trace intervals irrespective of the time relation of said line-trace intervals and said synchronizing signal; means for establishing a signal level in said television signal during said selected portions of said line-trace intervals; a control circuit responsive to an applied control signal for adjusting the amplitude value of said signal level; means for applying a unidirectional control signal, representing variations in the average level of said video-frequency components, to said control circuit to effect corresponding variations in the amplitude of said signal level; a random-signal generator for producing a noise signal; a circuit for impressing said noise signal on said signal level; a second control circuit responsive to an applied control signal for controlling the effective amplitude of said noise signal; and means for developing a second unidirectional control signal representing amplitude variations of the peak value of said video-frequency components and for applying said second control signal to said second control circuit.

References Cited in the file of this patent

UNITED STATES PATENTS

| Number | Name | Date |
| --- | --- | --- |
| 2,570,188 | Aram et al. | Oct. 9, 1951 |
| 2,572,853 | Gray | Oct. 30, 1951 |